United States Patent
Boubcher et al.

(10) Patent No.: US 9,799,414 B2
(45) Date of Patent: Oct. 24, 2017

(54) NUCLEAR FUEL BUNDLE CONTAINING THORIUM AND NUCLEAR REACTOR COMPRISING SAME

(75) Inventors: Mustapha Boubcher, Burlington (CA); Sermet Kuran, Mississauga (CA); Cathy Cottrell, Ancaster (CA); Robert R. Bodner, Oakville (CA); Holly Bruce Hamilton, Deep River (CA); Bronwyn H. Hyland, Deep River (CA); Benoit Arsenault, Georgetown (CA)

(73) Assignee: Atomic Energy of Canada Limited, Ontario (CA)

( * ) Notice: Subject to any disclaimer, the term of this patent is extended or adjusted under 35 U.S.C. 154(b) by 716 days.

(21) Appl. No.: 13/819,999

(22) PCT Filed: Sep. 3, 2010

(86) PCT No.: PCT/IB2010/002501
§ 371 (c)(1),
(2), (4) Date: Apr. 12, 2013

(87) PCT Pub. No.: WO2012/028900
PCT Pub. Date: Mar. 8, 2012

(65) Prior Publication Data
US 2013/0202076 A1 Aug. 8, 2013

(51) Int. Cl.
*G21C 3/60* (2006.01)
*G21C 3/326* (2006.01)
(Continued)

(52) U.S. Cl.
CPC ............ *G21C 3/326* (2013.01); *G21C 3/328* (2013.01); *G21C 3/58* (2013.01); *G21C 2003/3265* (2013.01); *Y02E 30/38* (2013.01)

(58) Field of Classification Search
USPC ......................................................... 376/435
See application file for complete search history.

(56) References Cited

U.S. PATENT DOCUMENTS 2,900,263 A 8/1959 Handwerk et al.
2,904,429 A 9/1959 Schonfeld
(Continued)

FOREIGN PATENT DOCUMENTS

BE 781976 7/1972
CA 1094698 1/1981
(Continued)

OTHER PUBLICATIONS

Sweden Patent Office Action for Application No. 1350236-4 dated Apr. 29, 2014 (9 pages—Including Translation).
(Continued)

*Primary Examiner* — Sean P Burke
(74) *Attorney, Agent, or Firm* — Michael Best & Friedrich LLP

(57) ABSTRACT

Fuel bundles for a nuclear reactor are disclosed, and in some embodiments include a first fuel element including thorium dioxide; a second fuel element including uranium having a first fissile content; and a third fuel element including uranium having a second fissile content different from the first fissile content. Nuclear reactors using such fuel bundles are also disclosed, including pressurized heavy water nuclear reactors. The uranium having the different fissile contents can include combinations of natural uranium, depleted uranium, recycled uranium, slightly enriched uranium, and low enriched uranium.

25 Claims, 8 Drawing Sheets

(51) Int. Cl.
   *G21C 3/328* (2006.01)
   *G21C 3/58* (2006.01)

(56) References Cited

U.S. PATENT DOCUMENTS

| | | | |
|---|---|---|---|
| 2,938,784 A | 5/1960 | Spedding et al. | |
| 3,007,769 A | 11/1961 | McCord et al. | |
| 3,031,389 A | 4/1962 | Goeddel | |
| 3,035,895 A | 5/1962 | McCorkle | |
| 3,041,260 A | 6/1962 | Goeddel | |
| 3,042,598 A | 7/1962 | Crowther | |
| 3,087,877 A | 4/1963 | Goeddel | |
| 3,103,479 A | 9/1963 | Ransohoff | |
| 3,104,219 A | 9/1963 | Sulzer | |
| 3,117,372 A | 1/1964 | McNees et al. | |
| 3,147,191 A | 9/1964 | Crowther | |
| 3,168,479 A | 2/1965 | St. Pierre | |
| 3,185,652 A | 5/1965 | Kleber et al. | |
| 3,197,376 A | 7/1965 | Balent et al. | |
| 3,208,912 A | 9/1965 | Jaye et al. | |
| 3,280,329 A | 10/1966 | Harmer et al. | |
| 3,291,869 A | 12/1966 | St. Pierre | |
| 3,293,135 A | 12/1966 | Jaye et al. | |
| 3,300,848 A | 1/1967 | Leitten, Jr. et al. | |
| 3,309,277 A | 3/1967 | Jaye et al. | |
| 3,354,044 A | 11/1967 | Law Robertson | |
| 3,374,178 A | 3/1968 | May et al. | |
| 3,446,703 A | 5/1969 | Lyons et al. | |
| 3,462,371 A | 8/1969 | Robertson | |
| 3,504,058 A | 3/1970 | Masselot | |
| 3,510,545 A | 5/1970 | Nishiyama et al. | |
| 3,660,228 A | 5/1972 | Magladry | |
| 3,671,453 A | 6/1972 | Triggiani et al. | |
| 3,712,852 A | 1/1973 | Fisher | |
| 3,745,069 A | 7/1973 | Sofer et al. | |
| 3,790,440 A | 2/1974 | Keshishian | |
| 3,799,839 A | 3/1974 | Fischer et al. | |
| 3,806,565 A | 4/1974 | Langrod | |
| 3,838,184 A | 9/1974 | Gyarmati et al. | |
| 3,887,486 A | 6/1975 | Googin et al. | |
| 3,960,655 A | 6/1976 | Bohanan et al. | |
| 3,988,397 A | 10/1976 | Hackstein et al. | |
| 3,991,154 A | 11/1976 | Zimmer et al. | |
| 3,992,258 A | 11/1976 | Tobin | |
| 3,992,494 A | 11/1976 | Holden | |
| 4,018,697 A | 4/1977 | Smith | |
| 4,020,131 A | 4/1977 | Feraday | |
| 4,022,662 A | 5/1977 | Gordon et al. | |
| 4,029,545 A | 6/1977 | Gordon et al. | |
| 4,032,400 A | 6/1977 | Johnson et al. | |
| 4,045,288 A | 8/1977 | Armijo | |
| 4,110,159 A | 8/1978 | Lee | |
| 4,119,563 A | 10/1978 | Kadner et al. | |
| 4,182,652 A | 1/1980 | Puechl | |
| 4,200,492 A | 4/1980 | Armijo et al. | |
| 4,202,793 A | 5/1980 | Bezzi et al. | |
| 4,229,260 A | 10/1980 | Johnson et al. | |
| 4,234,385 A | 11/1980 | Ozaki et al. | |
| 4,251,321 A | 2/1981 | Crowther | |
| 4,261,935 A | 4/1981 | Gutierrez et al. | |
| 4,264,540 A | 4/1981 | Butler | |
| 4,267,019 A | 5/1981 | Kaae et al. | |
| 4,273,613 A | 6/1981 | Radkowsky | |
| 4,331,618 A | 5/1982 | Hoyt | |
| 4,344,912 A | 8/1982 | Rampolla | |
| 4,362,691 A | 12/1982 | Lang et al. | |
| 4,381,281 A | 4/1983 | Lang et al. | |
| 4,382,885 A | 5/1983 | Haas | |
| 4,393,510 A | 7/1983 | Lang et al. | |
| 4,406,012 A | 9/1983 | Gordon et al. | |
| 4,493,809 A | 1/1985 | Simnad | |
| 4,587,090 A | 5/1986 | Mochida et al. | |
| 4,606,880 A | 8/1986 | Penkrot | |
| 4,637,915 A | 1/1987 | Camden, Jr. et al. | |
| 4,649,020 A | 3/1987 | Dehon et al. | |
| 4,652,416 A | 3/1987 | Millot | |
| 4,668,468 A | 5/1987 | Santucci | |
| 4,695,425 A | 9/1987 | Aoyama et al. | |
| 4,701,296 A | 10/1987 | Millot et al. | |
| 4,942,016 A | 7/1990 | Marlowe et al. | |
| 4,968,479 A | 11/1990 | Ogiya et al. | |
| 4,992,225 A | 2/1991 | Van Diemen et al. | |
| 4,997,596 A | 3/1991 | Proebstle et al. | |
| 5,024,809 A | 6/1991 | Taylor | |
| 5,037,606 A | 8/1991 | DeVelasco et al. | |
| 5,068,082 A | 11/1991 | Ueda et al. | |
| 5,089,210 A | 2/1992 | Reese et al. | |
| 5,136,619 A * | 8/1992 | Capossela | G21C 3/328 376/172 |
| 5,180,527 A | 1/1993 | Hirai et al. | |
| 5,202,085 A | 4/1993 | Aoyama et al. | |
| 5,255,299 A | 10/1993 | Hirai et al. | |
| 5,337,337 A | 8/1994 | Aoyama et al. | |
| 5,349,618 A | 9/1994 | Greenspan | |
| 5,377,247 A | 12/1994 | Yoshioka et al. | |
| 5,388,132 A | 2/1995 | Aoyama et al. | |
| 5,410,580 A | 4/1995 | Seino | |
| 5,429,775 A | 7/1995 | Hirai et al. | |
| 5,544,211 A | 8/1996 | Haikawa et al. | |
| 5,737,375 A | 4/1998 | Radkowsky | |
| 5,768,332 A | 6/1998 | Van Swam | |
| 5,812,621 A | 9/1998 | Takeda et al. | |
| 5,852,645 A | 12/1998 | Romary et al. | |
| 5,864,593 A | 1/1999 | Radkowsky | |
| 5,940,461 A | 8/1999 | Takeda et al. | |
| 5,949,837 A | 9/1999 | Radkowsky | |
| 6,005,905 A | 12/1999 | Yamanaka et al. | |
| 6,026,136 A | 2/2000 | Radkowsky | |
| 6,033,636 A | 3/2000 | Todokoro et al. | |
| 6,226,340 B1 | 5/2001 | Anderson | |
| 6,251,310 B1 | 6/2001 | Song et al. | |
| 6,327,324 B2 | 12/2001 | Nylund | |
| 6,512,805 B1 | 1/2003 | Takeda et al. | |
| 6,925,138 B2 | 8/2005 | Nakamaru et al. | |
| 7,172,741 B2 | 2/2007 | Kawamura et al. | |
| 7,295,646 B1 | 11/2007 | Wilbuer et al. | |
| 7,349,518 B2 | 3/2008 | Takeda et al. | |
| 2002/0118789 A1 | 8/2002 | McCartney | |
| 2004/0052326 A1 | 3/2004 | Blanpain et al. | |
| 2005/0069074 A1 | 3/2005 | Li et al. | |
| 2006/0171498 A1 | 8/2006 | D'Auvergne | |
| 2007/0064861 A1 | 3/2007 | Sterbentz | |
| 2007/0195919 A1 | 8/2007 | Bouffier | |
| 2007/0242791 A1 | 10/2007 | Dubois et al. | |
| 2008/0123797 A1 | 5/2008 | Hyde et al. | |
| 2008/0144762 A1 | 6/2008 | Holden et al. | |
| 2008/0219904 A1 | 9/2008 | Gregson et al. | |
| 2008/0226012 A1 | 9/2008 | Tsiklauri et al. | |
| 2009/0175402 A1 | 7/2009 | Hyde et al. | |
| 2009/0252278 A1 | 10/2009 | Bashkirtsev et al. | |
| 2009/0268861 A1 | 10/2009 | Shayer | |
| 2009/0269261 A1 | 10/2009 | Kim et al. | |
| 2009/0323881 A1 | 12/2009 | Dauvergne | |
| 2010/0034336 A1 | 2/2010 | Takeda et al. | |
| 2013/0301780 A1 | 11/2013 | Boubcher et al. | |

FOREIGN PATENT DOCUMENTS

| | | |
|---|---|---|
| CA | 2097412 | 12/1994 |
| CA | 2174983 | 10/1997 |
| CA | 2197412 | 6/2000 |
| CA | 2708902 | 6/2011 |
| CN | 1171164 | 1/1998 |
| CN | 2299593 | 11/2016 |
| EP | 55371 | 7/1982 |
| EP | 977206 | 2/2000 |
| GB | 903412 | 9/1962 |
| GB | 1236331 | 6/1971 |
| JP | 58142293 | 8/1983 |
| JP | 59120987 | 7/1984 |
| JP | 60085390 | 5/1985 |
| JP | 61038491 | 2/1986 |
| JP | 62000898 | 1/1987 |
| JP | 62032385 | 2/1987 |

(56) References Cited

FOREIGN PATENT DOCUMENTS

| | | |
|---|---|---|
| JP | 62052492 | 3/1987 |
| JP | 62194497 | 8/1987 |
| JP | 63083689 | 4/1988 |
| JP | 63204193 | 8/1988 |
| JP | 63269093 | 11/1988 |
| JP | 1153996 | 6/1989 |
| JP | 1178893 | 7/1989 |
| JP | 1193692 | 8/1989 |
| JP | 127779 | 11/1989 |
| JP | 1277798 | 11/1989 |
| JP | 3140896 | 6/1991 |
| JP | 11174179 | 7/1991 |
| JP | 3206995 | 9/1991 |
| JP | 4128688 | 4/1992 |
| JP | 6075077 | 3/1994 |
| JP | 7113887 | 5/1995 |
| JP | 7251031 | 10/1995 |
| JP | 11287881 | 10/1999 |
| JP | 11287890 | 10/1999 |
| JP | 2000056075 | 2/2000 |
| JP | 2000193773 | 7/2000 |
| JP | 2002062391 | 2/2002 |
| JP | 2004109085 | 4/2004 |
| JP | 2004144498 | 5/2004 |
| JP | 2004233066 | 8/2004 |
| JP | 2006029797 | 2/2006 |
| JP | 2008096366 | 4/2008 |
| JP | 2009222617 | 10/2009 |
| JP | 2011191145 | 9/2011 |
| RO | 118948 | 1/2004 |
| RU | 2110855 | 5/1998 |
| RU | 2110856 | 5/1998 |
| RU | 2113022 | 6/1998 |
| RU | 2200987 | 3/2003 |
| RU | 2307410 | 9/2007 |
| WO | WO 93/16477 | 8/1993 |
| WO | 98/11558 | 3/1998 |
| WO | WO 03/001534 | 1/2003 |
| WO | WO 2004/036595 | 4/2004 |
| WO | WO 2006/088516 | 8/2006 |
| WO | WO 2006/096505 | 9/2006 |
| WO | WO 2007/055615 | 5/2007 |
| WO | 2011/108975 | 9/2011 |
| WO | WO 2012/065249 | 5/2012 |
| WO | WO 2012/066367 | 5/2012 |
| WO | WO 2012/066368 | 9/2012 |

OTHER PUBLICATIONS

International Atomic Energy Agency, "Thorium fuel utilization: Options and trends" Proceedings of three IAEA meetings held in Vienna in 1997, 1998 and 1999, printed 2002 (1-376).
Boubcher et al., Physics Caracteristics of a Candu 6 Fuelled With Thorium Fuel (2009), TU2009, 4 pages.
Boczar et al., A Fresh Look at Thorium Fuel Cycles in Candu Reactors, Presented at 11th Pacific Basin Nuclear Conference, Banff Canada (1998), 13 pages.
Boczar et al., Qualifications of Reactor Physics Toolset for a Thorium-Fuelled Candu Reactor (2010), Paper No. ICONE 18-29763, 6 pages.
World Nuclear Association, "Processing of Used Nuclear Fuel", <http://www.world-nuclear.org/info/Nuclear-Fuel-Cycle/Fuel-Recycling/Processing-of-Used-Nuclear-Fuel/> webpage available as early as May 2012.
AECL, Low-Enriched and Recovered Uranium in CANDU Reactors (2008) AECL Mar. 2008 PP&I Graphics 1430, 2 pages.
IAEA, Management of Reprocessed Uranium Current Status and Future Prospects (2007), IAEA-TECDOC-1529, 108 pages.
Zhonsheng et al., Candu Fuel-Cycle Vision, China Journal of Nuclear Engineering (1999), vol. 20, No. 6, 18 pages.
Wikipedia, The manufacturing and quality plan of NUE for HWR, Apendix 2 and 3, <http://en.wikipedia.org/wiki/Reprocessed_uranium> webpage available as early as Sep. 13, 2006.
International Search Report and Written Opinion for Application No. PCT/IB2010/002915 dated Aug. 8, 2011 (8 pages).
International Preliminary Report on Patentability for Application No. PCT/IB2010/002915 dated May 6, 2013 (5 pages).
Roh et al., Nuclear Engineering and Design, Improvement of power coefficient by using burnable poison in the CANDU reactor (2011), 241, pp. 1565-1578.
International Preliminary Report on Patentability for Application No. PCT/IB2010/002914 dated Apr. 11, 2013 (18 pages).
Yu, An Overview of the ACR Design (2002) 48 pages.
International Search Report and Written Opinion for Application No. PCT/IB2010/002914 dated Aug. 15, 2011 (11 pages).
International Preliminary Report on Patentability for Application No. PCT/CA2011/001262 dated Apr. 11, 2013 (7 pages).
International Search Report and Written Opinion for Application No. PCT/CA2011/001262 dated Mar. 1, 2012 (9 pages).
Boczar et al., Thorium fuel utilization—Options and Trends (2002) IAEA-TECDOC-1319, pp. 29-30.
Margeanu et al., Thorium-based fuels preliminary lattice cell studies for CANDU reactors (2009) 7th conference on nuclear and particle physics, Nov. 11-15, 2009, 11 pages.
International Search Report and Written Opinion for Application No. PCT/IB2010/002501 dated Jun. 2, 2011 (7 pages).
Co-pending U.S. Appl. No. 13/885,582, filed May 15, 2013.
Co-pending U.S. Appl. No. 13/885,592, filed May 15, 2013.
Co-pending U.S. Appl. No. 13/885,579, filed Mar. 15, 2013.
PCT/IB2010/002501 International Preliminary Report on Patentability dated Mar. 5, 2013 (6 pages).
Boczar et al., "Thorium fuel-cycle studies for CANDU reactors," <<thorium fuel utilization: options and trends>>, vol. 3, Issue 3, pp. 25-41.
Thompson, C. A., "Nuclear energy research initiative: Thorium fuel cycle projects," <<thorium fuel utilization: options and trends>>, vol. 3, Issue 3, pp. 97-103.
Pinheiro, R. Brant, "Brazilian Experience on Thorium Fuel Cycle Investigations," <<thorium fuel utilization: options and trends>>, vol. 3, Issue 3, pp. 13-21.
Notification of the First Office Action from the Intellectual Property Office of the People's Republic of China for Application No. 201080068932.X, dated Feb. 17, 2015 (21 pages).
Boczar, Peter, "CANDU Fuel Cycle Vision," Nuclear Power Engineering, vol. 20, No. 6, Dec. 1999 (7 pages).
English translation of RU2200987 dated Feb. 7, 2001 (9 pages).
English translation of Boczar, Peter, "CANDU Fuel Cycle Vision," Nuclear Power Engineering, vol. 20, No. 6, Dec. 1999 (13 pages).
Koclas, Jean. "Reactor Control and Simulation." Chulalongkom University, Thailand (published and available to the public in 1996). Presently available online: <https://canteach.candu.org/Content%20Library/20044313.pdf>.
Yih, Tien Sieh, and Peter Griffith. Unsteady momentum fluxes in two-phase flow and the vibration of nuclear reactor components. Cambridge, Mass: MIT Dept. of Mechanical Engineering. Published and available to the public in 1968. p. 3-1 through 4-9. Presently available online: <http://dspace.mit.edu/handle/1721.1/61496>.
IP3 FSAR Update. Dec. 3, 2007. Exhibit FP No. 12, Indian Point Unit 3. Accession No. ML081960748. Available online: <https://adamswebsearch2.nrc.gov/webSearch2/main.jsp?AccessionNumber=ML081960748>.
Office Action Summary from the Korean Patent and Trademark Office for Application No. 10-2013-7008564 dated Jun. 1, 2016 (4 pages).
Office Action from the United States Patent and Trademark Office for U.S. Appl. No. 13/823,270 dated Jun. 3, 2016 (20 pages).
Office Action from the United States Patent and Trademark Office for U.S. Appl. No. 13/804,795 dated Jun. 7, 2016 (29 pages).
Mingjun, M. et al., "Feasibility Analysis and Demonstration Project of Using Pressurized Water Reactor Recycled Uranium as the Fuel of Heavy Water Reactor," Collection of Papers of Seminar on Small Scale "Recycling Economy" pp. 30-37.
ORNL/TM-2007/207 Analysis of the Reuse of Uranium Recovered from the Reprocessing of Commercial LWR Spent Fuel. Jan. 2009.

(56) References Cited

OTHER PUBLICATIONS

Boczar et al., "Thorium fuel utilization—Options and Trends," 2002, IAEA-TECDOC-1319 pp. 29-30.
Hatcher, S.R., Prospects for Future Candu Fuel Cycles, (1979) 12 pages.
Office Action from the United States Patent and Trademark Office for U.S. Appl. No. 13/885,579 dated May 31, 2016 (54 pages).
IAEA TechDoc 1630, "Use of Reprocessed Uranium," Vienna, Aug. 2007.
Office Action from the United States Patent and Trademark Office for U.S. Appl. No. 13/885,582 dated Feb. 4, 2016 (40 pages).
Recent Advances in Thorium Fuel Cycles for CANDU Reactors, P.G. Boczar et.al, <<Thorium fuel-cycle studies for CANDU reactors >>, vol. 3, Issue 3, pp. 104-119 (2002).
English Translation of Second Chinese Office Action for Application CN201080071079.7 dated Dec. 14, 2015 (10 pages).
English Translation of Second Chinese Office Action for Application CN201080071078.2 dated Dec. 28, 2015 (8 pages).
English Translation of Second Chinese Office Action for Application CN201180064587.7 dated Dec. 28, 2015 (6 pages).
English Translation of Second Chinese Office Action for Application CN201080068932.X dated Dec. 7, 2015 (13 pages).
Office Action from the United States Patent and Trademark Office for U.S. Appl. No. 13/885,592 dated Feb. 16, 2016 (10 pages).
Extended European Search Report from the European Patent Office for Application No. 10856635.7 dated Nov. 30, 2016 (7 pages).
Office Action from the United States Patent and Trademark Office for U.S. Appl. No. 13/885,579 dated Oct. 11, 2016 (16 pages).
Boczar et al., "Recycling in CANDU of Uranium and/or Plutonium from Spent LWR fuel," IAEA Technical Committee Meeting on Recycling of Plutonium and Uranium in Water Reactor Fuels, Cadarache, France, Nov. 13-16, 1989 (31 pages).
"Reactivity Effect Due to Temperature Changes and Coolant Voicing," from https://canteach.candu.org/Pages/Welcome.aspx, Course 22106, Module 12, Jul. 1997 (29 pages).
English translation of first Korean Office Action dated Sep. 1, 2016 (1 page).
Del Cul et al., "Analysis of the Reuse of Uranium Recovered from the Reprocessing of Commercial LWR Spent Fuel," ORNL/TM-2007/207 (Jan. 2009), 62 pages.
Horhoianu et al., "Technical feasiibility of using RU-43 fuel in the CANDU-6 reactors of the Cernavoda NPP." (Jan. 15, 2008), 8 pages.
Office Action from the United States Patent and Trademark Office for U.S. Appl. No. 13/885,592 dated Jul. 11, 2016 (14 pages).
Office Action from the United States Patent and Trademark Office for U.S. Appl. No. 13/885,582 dated Aug. 2, 2016 (24 pages).
Fuel Temperature Coefficient—Doppler Coefficient, Nuclear-Power.net, available at: http://www.nuclear-power.net/nuclear-power/reactor-physics/nuclear-fission-chain-reaction/reactivity-co-efficients-reactivity-feedbacks/fuel-temperature-coefficient-doppler-coefficient/.
English translation of Korean Office Action Summary for Application No. 10-2013-7015371 dated Jul. 19, 2016 (4 pages).
Boczar, P. G. et al., "Thorium fuel-cycle CANDU for Candu reactors," Proceedings of an IAEA International Conference, Vienna, AT, dated Jan. 1, 1998 (pp. 25-41).
Extended European Search Report for Application No. EP10 85 6635, dated Nov. 30, 2016 (7 pages).
Office Action from the United States Patent and Trademark Office for U.S. Appl. No. 13/885,592 dated Jan. 5, 2017 (13 pages).
Zhongsheng et al., "Advanced CANDU fuel cycle vision"—China Journal of Nuclear Engineering, vol. 20, No. 6, Oct. 30, 1999 (Oct. 30, 1999) https://canteach.candu.org/Content%20Libray/20054415.pdf.
Chang-Joon Jeong et al., "Compatibility Analysis on Existing Reactivity Devices in CANDU 6 Reactors for DUPIC Fuel Cycle"—Nucklear Science and Engineering, vol. 134, p. 265-280, Mar. 2000 http://www.ans.org/pubs/journals/nse/a_2115.
Canadian Office Action for Application No. 2,817,884 dated Feb. 14, 2017 (5 pages).
Canadian Office Action for Application No. 2,817,767 dated Feb. 6, 2017 (4 pages).
Canadian Office Action for Application No. 2,820,125 dated Feb. 15, 2017 (4 pages).
Passing Preliminary Report from the People's Republic of China for Application No. 201610821878.0 dated Jan. 23, 2017 (1 page).
Passing Preliminary Report from the People's Republic of China for Application No. 201610913807.3 dated Jan. 19, 2017 (2 pages).
Final Office Action from the Korean Patent and Trademark Office for Application No. 10-2013-7015371 dated Feb. 1, 2017 (9 pages).
Final Office Action from the Korean Patent and Trademark Office for Application No. 10-2013-7008564 dated Dec. 30, 2016 (5 pages).
Sahin et al., "Candu reactor as minor actinide/thorium burner with uniform power density in the fuel bundle"—Annals of Nuclear Energy—Apr. 2008, DOI: 10. 1016/j.anucene2007.08.003, retrieved from the internet.
Whitlock, "The Evolution of Candu Fuel Cycles and Their Potential Contribution to World Peace," International Youth Nuclear Congress, 2000—iaea.org, retrieved from the internet: http://www.iaea.org/inis/collection/NCLCollectionStore/_Public/33/011/33011302.pdf.
Canadian Office Action for Application No. 2,810,133 dated Sep. 21, 2016 (4 pages).
Office Action from the United States Patent and Trademark Office for U.S. Appl. No. 13/885,592 dated Apr. 19, 2017 (13 pages).
Final Office Action from the Korean Patent and Trademark Office for Application No. 10-2013-7015370 dated Mar. 31, 2017 (9 pages).
Final Office Action from the Korean Patent and Trademark Office for Application No. 10-2013-7015369 dated Mar. 31, 2017 (9 pages).
International Preliminary Report on Patentability for Application No. PCT/IB2010/002915 dated Apr. 15, 2013 (7 pages).
English Translation of Office Action from Korean Patent and Trademark Office for Application No. 10-2013-7015369 dated Sep. 1, 2016 (1pages).
English Translation of Office Action from Korean Patent and Trademark Office for Application No. 10-2013-7015370 dated Sep. 1, 2016 (1pages).
Introductin to Nuclear Kinetics, Chapter 12.
Hamel, "An Economic Analysis of Select Fuel Cycles Using the Steady-State Analysis Model for Advanced Fuel Cycles Schemes (SMAFS)," report (Dec. 2007) 70 pages, EPRI, Electric Power Research Institute, Palo Alto.
Renier et al., "Development of Improved Burnable Poisons for Commercial Nuclear Power Reactors," report on NERI Project No. 99-0074, ORNL/TM-2001/238 (Oct. 2001) 760 pages.
Sullivan et al., "AECL's Progress in Dupic Fuel Development," paper, 5th International CNS CANDU Fuel Conference (Sep. 21-25, 1997) pp. 300-310, AECL, Canada.
Office Action from the United States Patent and Trademark Office for U.S. Appl. No. 13/885,579 dated May 12, 2017 (21 pages).
International Search Report and Written Opinion for Application No. PCT/IB2016/000114 dated May 10, 2016 (8 pages).
International Preliminary Report on Patentability for Application No. PCT/IB2016/000114 dated May 11, 2017 (37 pages).
Office Action from the Romanian Patent Office for Application No. 2013-00361 dated Jun. 23, 2017 (4 pages, which includes a Statement of Relevance).
Office Action from the Romanian Patent Office for Application No. 2013-00186 dated Jun. 12, 2017 (4 pages, which includes a Statement of Relevance).
Zhongsheng, et al., "Advanced CANDU Fuel Cycle Vision," Nuclear Power Engineering, vol. 20, Issue 6, Dec. 1999 (7 pages).
English translation of First Office Action from the Intellectual Property Office of the People's Republic of China for Application No. 201080071078.2 dated Apr. 17, 2015 (9 pages).
Office Action from the Romanian Patent Office for Application No. 2013-00362 dated Jul. 24, 2017 (5 pages, which includes a Statement of Relevance).

(56) References Cited

OTHER PUBLICATIONS

Office Action from the Romanian Patent Office for Application No. 2013-00360 dated Jul. 24, 2017 (5 pages, which includes a Statement of Relevance).

Office Action from the Korean Patent and Trademark Office for Application No. 10-2017-7008647 dated Jul. 26, 2017 (5 pages)

* cited by examiner

NUCLEAR FUEL BUNDLE CONTAINING THORIUM AND NUCLEAR REACTOR COMPRISING SAME

CROSS-REFERENCE TO RELATED APPLICATIONS

This patent application is a national stage filing under 35 U.S.C. 371 of International Application No. PCT/IB2010/002501, filed Sep. 3, 2010, the disclosure of which is incorporated by reference herein in its entirety, and which priority is hereby claimed.

BACKGROUND

The present invention relates to a nuclear fuel bundle containing thorium as a nuclear fuel for use in a nuclear reactor.

Nuclear reactors generate energy from a nuclear chain reaction (i.e., nuclear fission) in which a free neutron is absorbed by the nucleus of a fissile atom in a nuclear fuel, such as Uranium-235 ($^{235}U$). When the free neutron is absorbed, the fissile atom splits into lighter atoms and releases more free neutrons to be absorbed by other fissile atoms, resulting in a nuclear chain reaction, as is well understood in the art. Thermal energy released from the nuclear chain reaction is converted into electrical energy through a number of other processes also well known to those skilled in the art.

SUMMARY

In some embodiments of the present invention, a fuel bundle for a nuclear reactor is provided, and comprises a first fuel element including thorium dioxide; a second fuel element including uranium having a first fissile content; and a third fuel element including uranium having a second fissile content different from the first fissile content.

Some embodiments of the present invention provide methods of manufacturing and using a fuel bundle for a nuclear reactor having a first fuel element including thorium dioxide; a second fuel element including uranium having a first fissile content; and a third fuel element including uranium having a second fissile content different from the first fissile content.

Also, some embodiments of the present invention provide a nuclear reactor having at least one fuel bundle having a first fuel element including thorium dioxide; a second fuel element including uranium having a first fissile content; and a third fuel element including uranium having a second fissile content different from the first fissile content.

In some embodiments, any of the fuel bundles and methods just described are utilized in a pressurized heavy water reactor, such as fuel bundles having a first fuel element including thorium dioxide; a second fuel element including uranium having a first fissile content; and a third fuel element including uranium having a second fissile content different from the first fissile content, wherein the fuel bundles are located within one or more tubes of pressurized water that flow past the fuel bundles, absorb heat from the fuel bundles, and perform work downstream of the fuel bundles.

Other aspects of the present invention will become apparent by consideration of the detailed description and accompanying drawings.

DETAILED DESCRIPTION

Before any embodiments of the invention are explained in detail, it is to be understood that the invention is not limited in its application to the details of embodiment and the arrangement of components set forth in the following description or illustrated in the accompanying drawings. The invention is capable of other embodiments and of being practiced or of being carried out in various ways.

Figure 6:
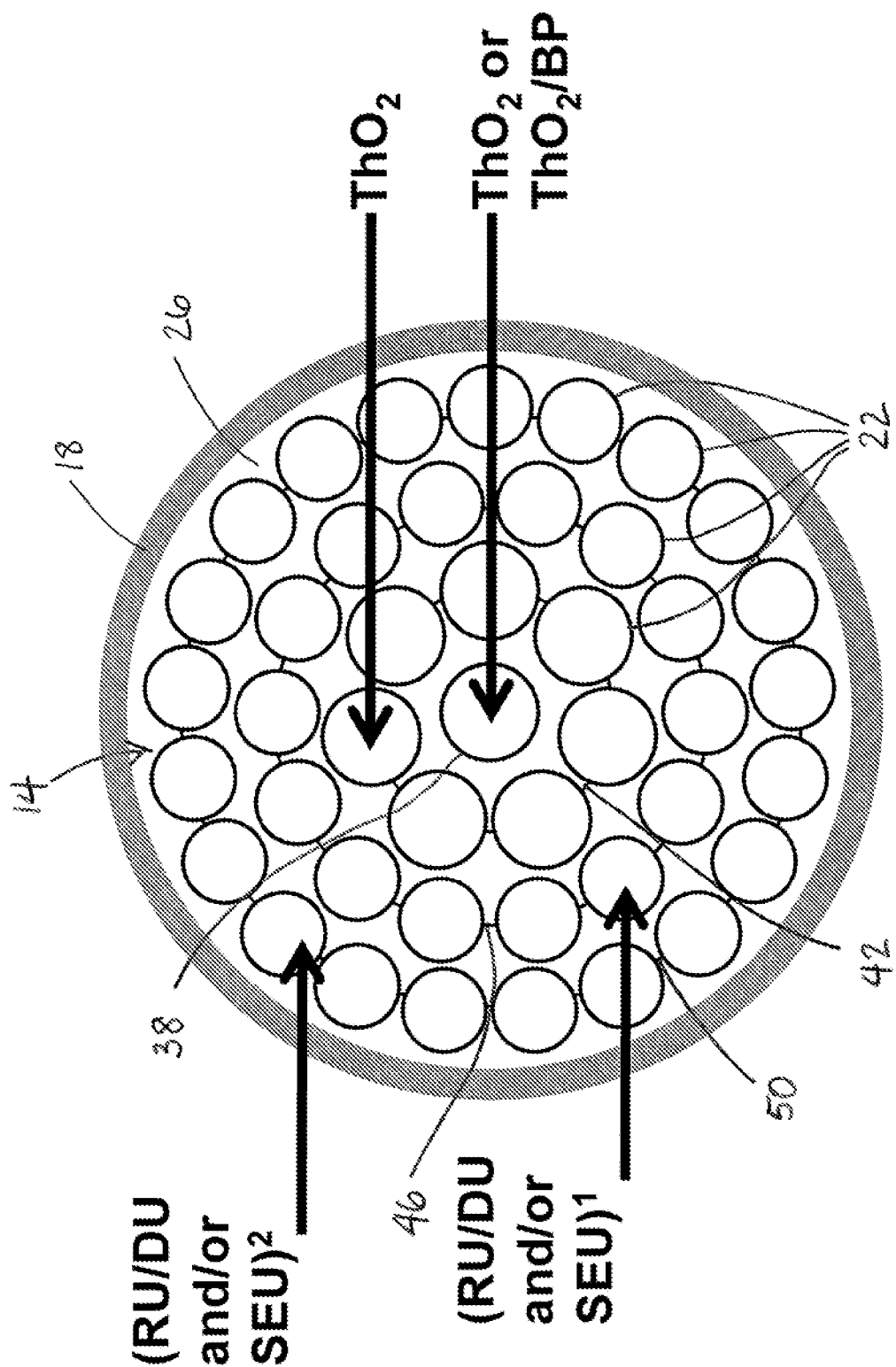
FIG. 6 is a cross-sectional view of a sixth embodiment of a nuclear fuel bundle in accordance with the invention.
Figure 7:
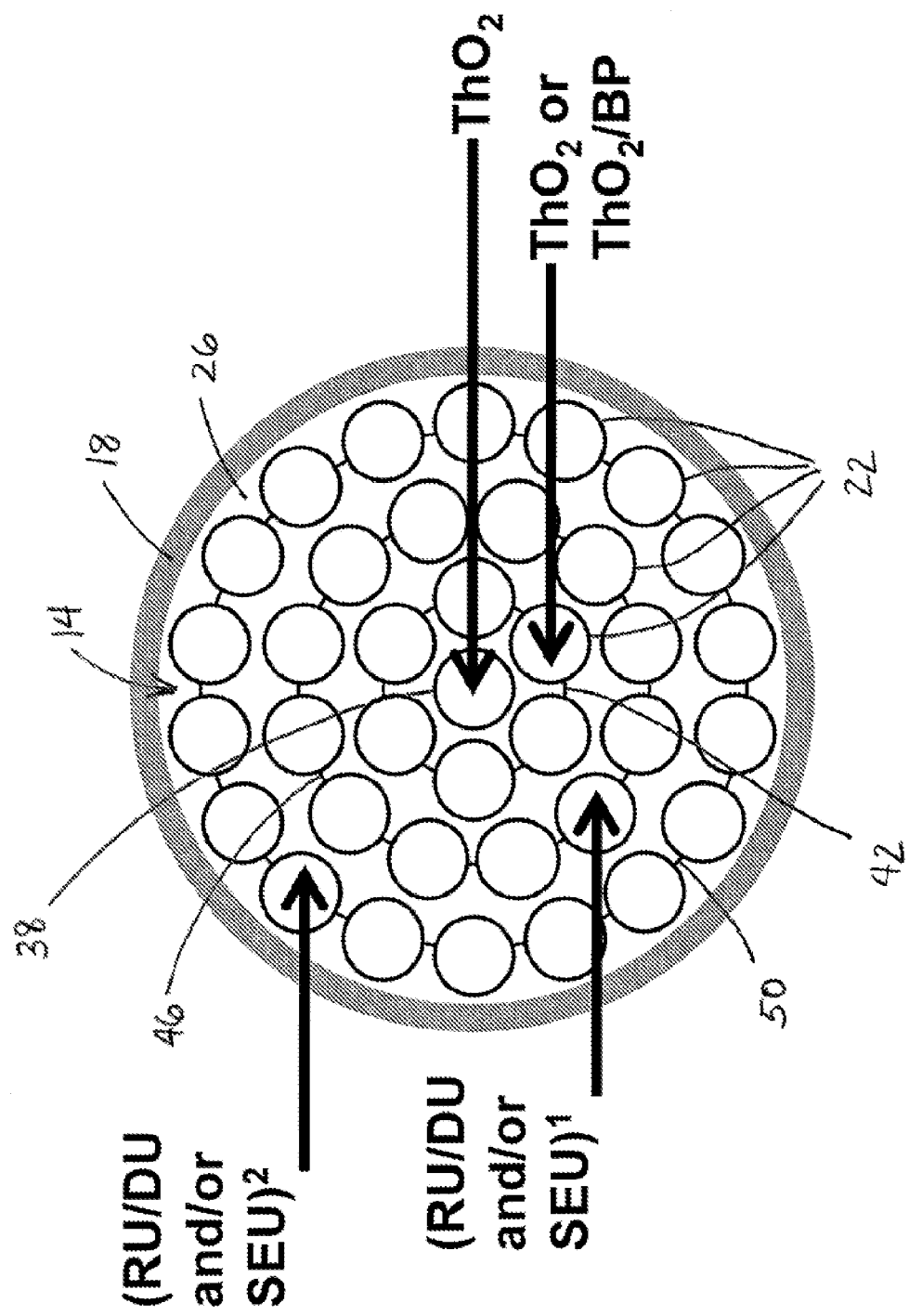
FIG. 7 is a cross-sectional view of a seventh embodiment of a nuclear fuel bundle in accordance with the invention.
Figure 8:
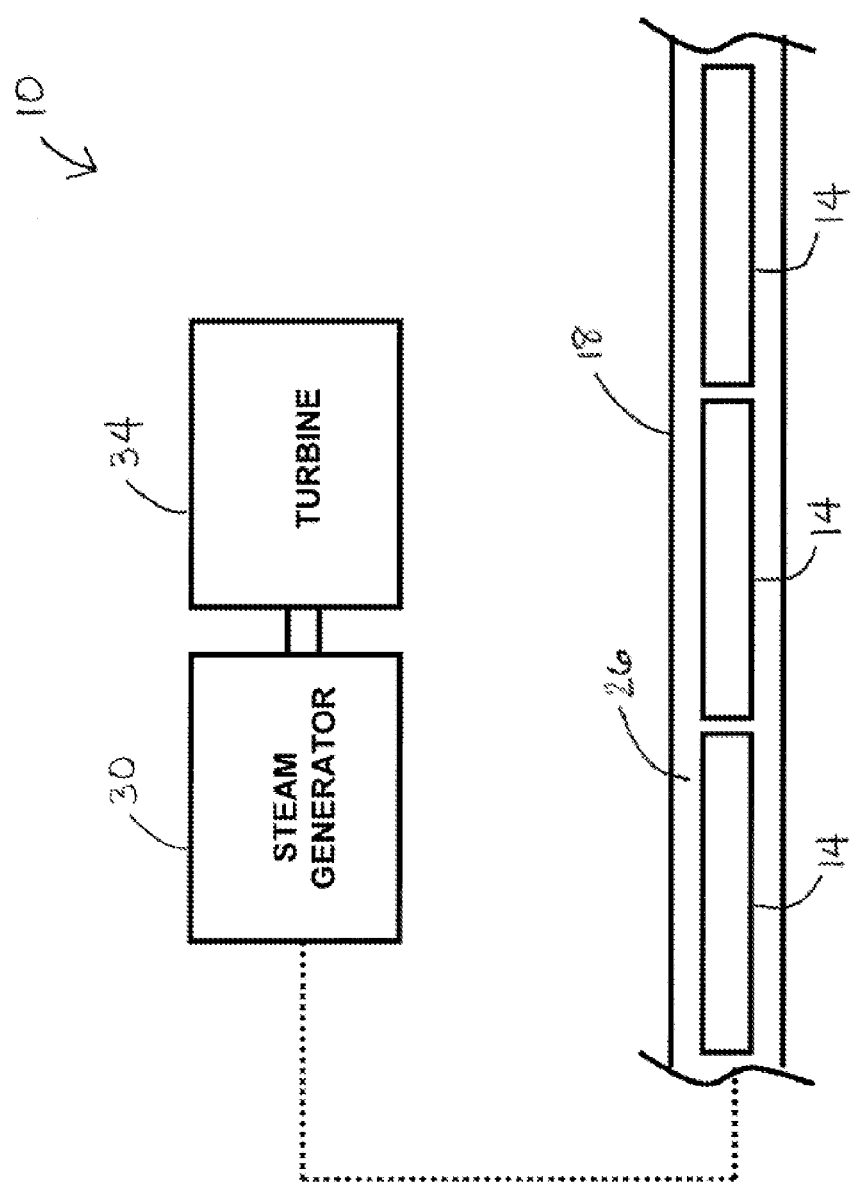
FIG. 8 is a schematic diagram of a nuclear reactor employing any of the fuel bundles of FIGS. 1-7.

FIGS. 1-7 illustrate various embodiments of a nuclear fuel bundle for use in a nuclear reactor, such as a pressurized heavy water reactor 10 (e.g., a Canadian Deuterium Uranium (CANDU) type nuclear reactor), a portion of which is shown schematically in FIG. 8. The following description of various embodiments of the present invention is provided in the context of a pressurized heavy water reactor having pressurized horizontal tubes within which the fuel bundles 14 are positioned. This nuclear reactor environment and application of the fuel bundles according to the present invention is presented by way of example only, it being understood that the present invention is applicable to fuel bundles adapted for use in other types of nuclear reactors.

With reference to FIG. 8, the reactor core of the pressured heavy water reactor 10 contains one or more fuel bundles 14. If the reactor 10 includes a plurality of fuel bundles 14, the bundles 14 can be placed end-to-end inside a pressure tube 18. In other types of reactors, the fuel bundles 14 can be arranged in other manners as desired. Each fuel bundle 14 contains a set of fuel elements 22 (sometimes referred to as "pins"), each containing a nuclear fuel and/or other elements or chemicals (e.g., a burnable poison), which will be described in greater detail below in connection with FIGS. 1-7. When the reactor 10 is in operation, a heavy water coolant 26 flows over the fuel bundles 14 to cool the fuel elements and remove heat from the fission process. The coolant 26 can also transfer the heat to a steam generator 30 that drives an prime mover, such as a turbine 34, to produce electrical energy.

Canadian Patent Application No. 2,174,983, filed on Apr. 25, 1996, describes other fuel bundles for a nuclear reactor used in a manner similar to the fuel bundles 14 of the present invention described and illustrated herein. The contents of Canadian Patent Application No. 2,174,983 are incorporated herein by reference.

FIGS. 1-7 illustrate cross-sectional views of various embodiments of the fuel bundle 14 positioned in the pressure tube 18. Heavy water coolant 26 is contained within the pressure tube 18, and occupies subchannels between the fuel elements 22. The fuel elements 22 can include a central element 38, a first plurality of elements 42 positioned radially outward from the central element 38, a second plurality of elements 46 positioned radially outward from the first plurality of elements 42, and a third plurality of elements 50 positioned radially outward from the second plurality of elements 46. It should be understood that in other embodiments, the fuel bundle can include fewer or more elements, and can include elements in configurations other than those illustrated in FIGS. 1-7. For example, the fuel elements 22 can be positioned parallel to one another in one or more planes, elements arranged in a matrix or array having a block shape or any other shape, and elements in any other patterned or patternless configuration. The pressure tube 18, the fuel bundle 14, and/or the fuel elements 22 can also be configured in various shapes and sizes. For example, the pressure tubes 18, fuel bundles 14, and fuel elements 22 can have any cross-sectional shapes (other than the round shapes shown in FIGS. 1-7) and sizes as desired. As another example, the pressure tubes 18 and fuel bundles 14 can have any relative sizes (other than the uniform size or two-size versions of the pressure tubes 18 and fuel elements 22 shown in FIGS. 1-7).

In each of the embodiments of FIGS. 1-6, a 43-element fuel bundle 14 is illustrated. The first plurality of elements 42 includes seven elements arranged in parallel with one another in a generally circular pattern. The second plurality of elements 46 includes fourteen elements arranged in parallel with one another in a generally circular pattern. The third plurality of elements 50 includes twenty-one elements arranged in parallel with one another in a generally circular pattern. The central element 38, the first plurality of elements 42, the second plurality of elements 46, and the third plurality of elements 50 are arranged concentrically such that all of the elements 22 are in parallel with one another. The central element 38 and each of the first plurality of elements 42 have a first cross-sectional size (or diameter, in the case of elements having a round cross-sectional shape), and each of the second plurality 46 and third plurality 50 of elements have a second cross-sectional size (or diameter, in the case of elements having a round cross-sectional shape) different from the first cross-sectional size. In particular, the first cross-sectional size is greater than the second cross-sectional size. In this regard, the term "cross-sectional shape" refers to the cross-sectional shape generated by a plane passing through the body referred to in an orientation that is perpendicular to a longitudinal axis of the body. It should also be understood that the lines included in FIGS. 1-6 indicating the generally circular position of the elements 22 is for illustration purposes only and does not necessarily indicate that elements are tethered together or otherwise coupled in a particular arrangement.

In the embodiment of FIG. 7, a 37-element fuel bundle is illustrated in which all of the fuel elements 22 have a uniform cross-sectional size (or diameter, in the case of elements having a round cross-sectional shape). The first plurality of elements 42 includes six elements arranged in parallel with one another in a generally circular pattern. The second plurality of elements 46 includes twelve elements arranged in parallel with one another in a generally circular pattern. The third plurality of elements 50 includes eighteen elements arranged in parallel with one another in a generally circular pattern. The central element 38, the first plurality of elements 42, the second plurality of elements 46, and the third plurality of elements 50 are arranged concentrically such that all of the elements 22 are in parallel with one another. It should be understood that the lines included in FIG. 7 indicating the generally circular position of the elements 22 is for illustration purposes only, and does not necessarily indicate that elements are tethered together or otherwise coupled in a particular arrangement.

In some embodiments, each of the fuel elements 22 includes a tube filled with nuclear fuel. The tube can be made of or include zirconium, a zirconium alloy, or another suitable material or combination of materials that is some cases is characterized by low neutron absorption. The tube can be filled with the one or more materials, such as nuclear fuel alone or in combination with other materials. The material(s) can be in pellet form, powder form, or in another suitable form or combination of forms. In other embodiments, each of the fuel elements 22 includes a rod formed from one or more materials (e.g., nuclear fuel alone or in combination with other materials), such as nuclear fuel contained within a matrix of other material. In yet other embodiments, the fuel elements 22 can include a combination of tubes and rods and/or other configurations, and the fuel elements 22 can take on other configurations suitable for the particular application.

As shown in FIGS. 1-7, the fuel elements 22 can include various combinations of nuclear fuels, such as thorium dioxide ($ThO_2$), depleted uranium (DU), natural uranium (NU), recycled uranium (RU), slightly enriched uranium (SEU) and low enriched uranium (LEU), which will be described in greater detail below. As used here and in the appended claims, references to "percentage" of constituent components of material included in a fuel bundle 14, fuel element 22, or other feature refers to percentage weight, unless specified otherwise. As defined herein, DU has a fissile content of approximately 0.2 wt % to approximately 0.5 wt % of $^{235}U$ (including approximately 0.2 wt % and approximately 0.5 wt %), NU has a fissile content of approximately 0.71 wt % of $^{235}U$, RU has a fissile content of approximately 0.72 wt % to approximately 1.2 wt % of $^{235}U$ (including approximately 0.72 wt % and approximately 1.2 wt %), SEU has a fissile content of approximately 0.9 wt % to approximately 3 wt % of $^{235}U$ (including approximately 0.9 wt % and approximately 3 wt %), and LEU has a fissile content of approximately 3 wt % to approximately 20 wt % of $^{235}U$ (including approximately 3 wt % and approximately 20 wt %).

Figure 1:
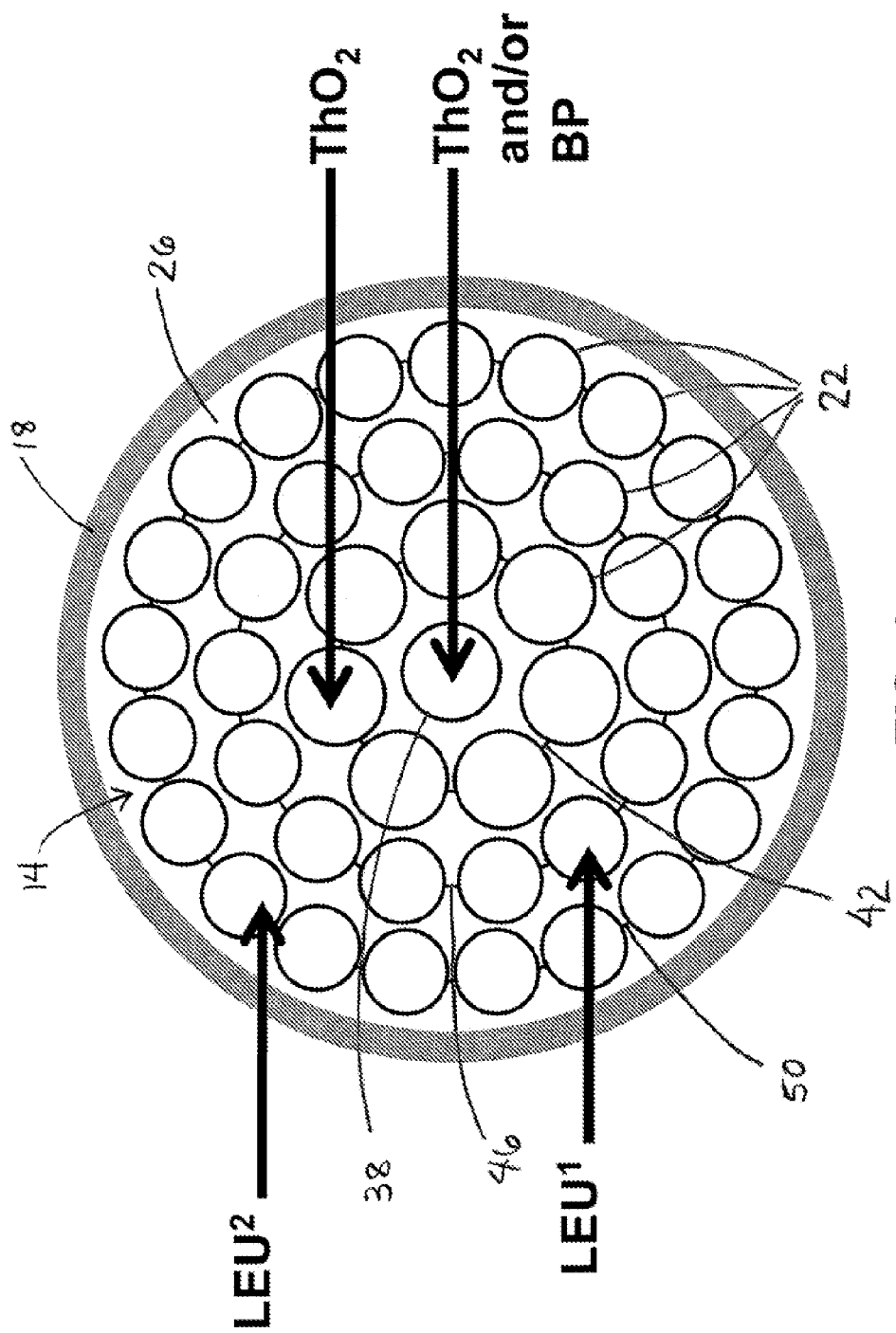
FIG. 1 is a cross-sectional view of a first embodiment of a nuclear fuel bundle in accordance with the invention.

In the embodiment of FIG. 1, the central element 38 includes thorium dioxide and/or a burnable poison (BP), such as gadolinium or dysprosium. In some embodiments, 0-10 vol % BP is utilized. In other embodiments, 0-7 vol % BP is utilized. In other embodiments, 0-6 vol % BP is utilized. In yet other embodiments, 0-3 vol % BP is utilized. The first plurality of elements 42 includes thorium dioxide. The second plurality of elements 46 includes LEU having a first fissile content ($LEU^1$), and each of the third plurality of elements 50 includes LEU having a second fissile content ($LEU^2$) that is different from the first fissile content. It is to be understood that the fissile content of the second plurality of elements 46 ($LEU^1$) is chosen from the range defined above, and the fissile content of the third plurality of elements 50 ($LEU^2$) is also chosen from the same range defined, but is different from the fissile content chosen for the second plurality of elements 46. For example, $LEU^1$ may have a fissile content of approximately 4 wt % of $^{235}U$ and $LEU^2$ may have a fissile content of approximately 4.5 wt % of $^{235}U$. In some embodiments of FIG. 1, a BP may be included in any of the fuel elements 22 illustrated in FIG. 1. Also, any of the amounts of BP just described can be included in any or all of the fuel elements of each fuel bundle embodiment described and/or illustrated herein. In other embodiments, one of the outer two pluralities of elements (i.e., either the second plurality of elements 46 or the third plurality of elements 50) can include DU, NU, RU or SEU, instead of LEU, having a second fissile content that is different from the fissile content of LEU in the other of the outer two pluralities of elements. In some embodiments, the fissile content of nuclear fuel decreases in an outward radial direction from the center of the fuel bundle 14. In other embodiments, however, the fissile content increases in an outward radial direction from the center of the fuel bundle 14.

Figure 2:
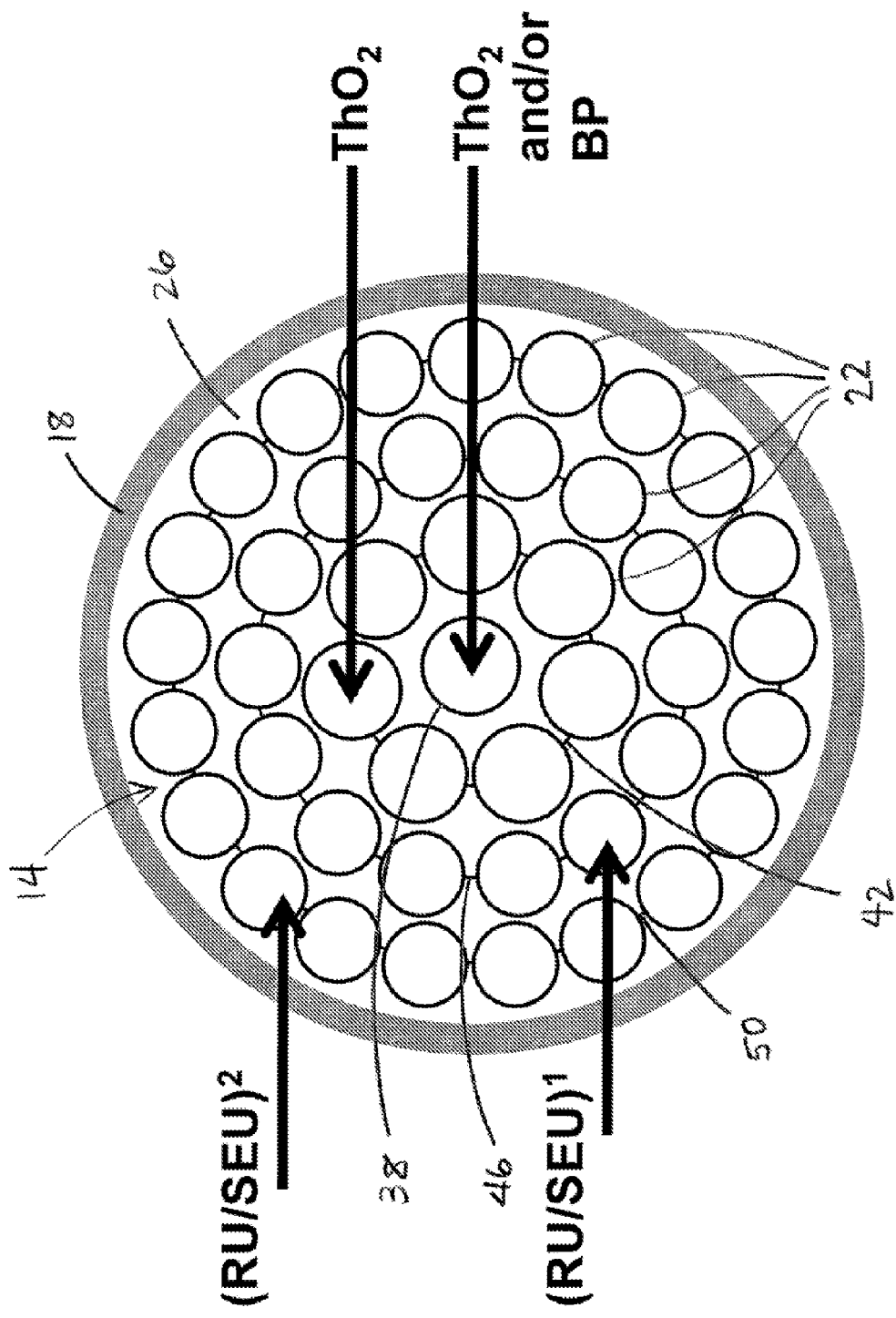
FIG. 2 is a cross-sectional view of a second embodiment of a nuclear fuel bundle in accordance with the invention.

In the embodiment of FIG. 2, the central element 38 includes thorium dioxide and/or a burnable poison (BP), such as gadolinium or dysprosium. In some embodiments, 0-10 vol % BP by volume is utilized. In other embodiments, 0-7 vol % BP is utilized. In other embodiments, 0-6 vol % BP is utilized. In yet other embodiments, 0-3 vol % BP is utilized. The first plurality of elements 42 includes thorium dioxide. The second plurality of elements 46 includes a first fissile content of a blend (generally designated herein by the use of a slash "/") of RU and SEU (RU/SEU)$^1$, which are blended using any method known in the art, such as but not limited to using an acid solution or dry mixing. The third plurality of elements 50 includes a second blend of RU and SEU (RU/SEU)$^2$ having a second fissile content different from the first fissile content. It is to be understood that the fissile content of the second plurality of elements 46 (RU/SEU)$^1$ is chosen from the range between and including approximately 0.72 wt % to approximately 3 wt % of $^{235}$U. The fissile content of the third plurality of elements 50 (RU/SEU)$^2$ is also chosen from the same range, but is different from the fissile content chosen for the second plurality of elements 46. In some embodiments of FIG. 2, a BP may be included in any of the fuel elements 22. In some embodiments, the fissile content of nuclear fuel decreases in an outward radial direction from the center of the fuel bundle 14. However, in other embodiments, the fissile content increases in an outward radial direction from the center of the fuel bundle 14. It should also be generally noted that RU is not limited to being mixed with SEU. In other embodiments, RU can be mixed with LEU or highly enriched uranium (HEU) in order to result in an average fissile content at a desired level.

Figure 3:
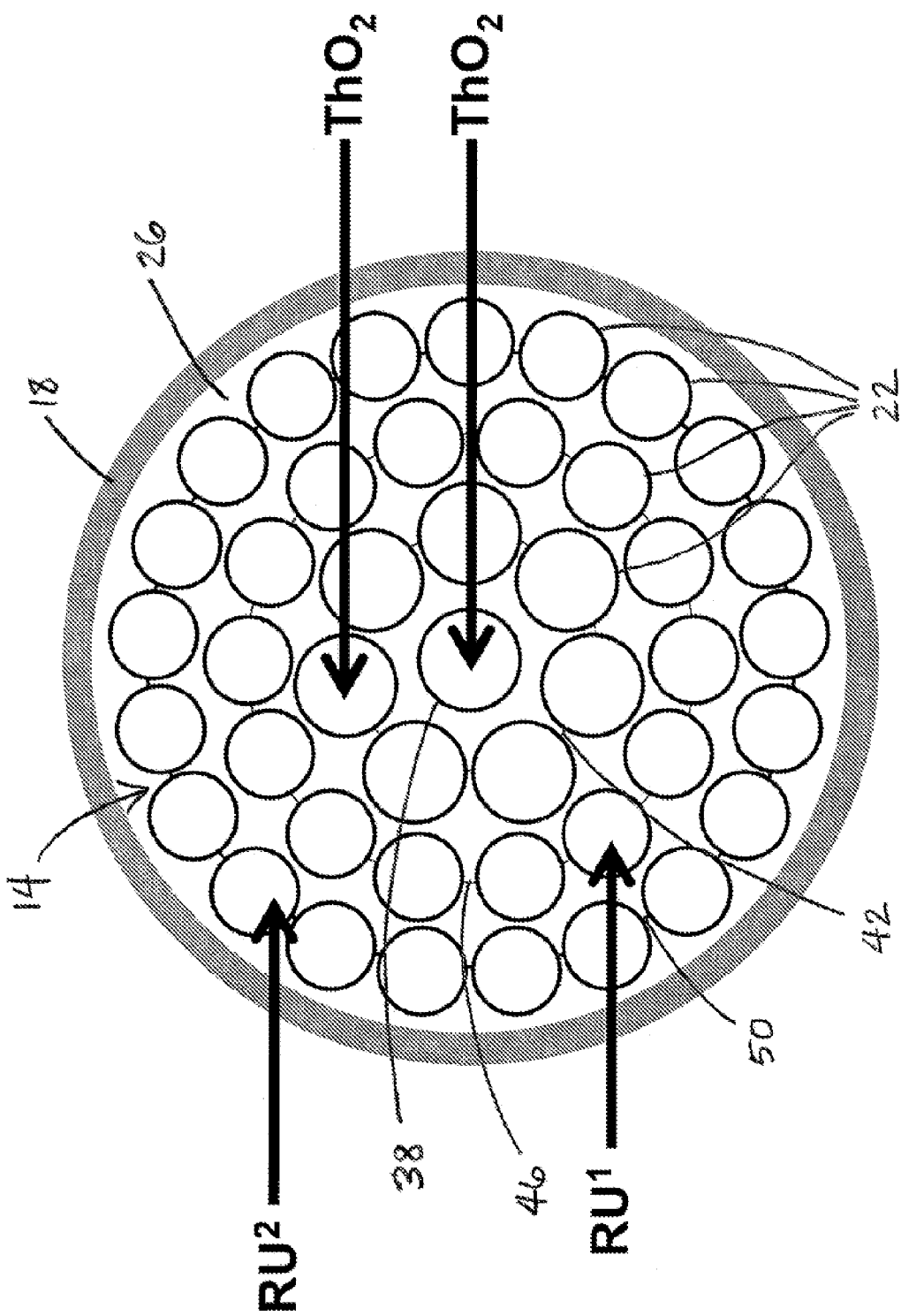
FIG. 3 is a cross-sectional view of a third embodiment of a nuclear fuel bundle in accordance with the invention.

In the embodiment of FIG. 3, the central element 38 includes thorium dioxide and the first plurality of elements 42 includes thorium dioxide. The second plurality of elements 46 includes RU having a first fissile content (RU$^1$), and the third plurality of elements 50 includes RU having a second fissile content (RU$^2$) different from the first fissile content. It is to be understood that the fissile content of the second plurality of elements 46 (RU$^1$) is chosen from the range defined above, and the fissile content of the third plurality of elements 50 (RU$^2$) is also chosen from the range defined above, but is different from the fissile content chosen for the second plurality of elements 46. In some embodiments of FIG. 3, a BP may be included in any of the fuel elements 22. In some embodiments, the fissile content of nuclear fuel decreases in an outward radial direction from the center of the fuel bundle 14. In other embodiments, the fissile content increases in an outward radial direction from the center of the fuel bundle 14.

Figure 4:
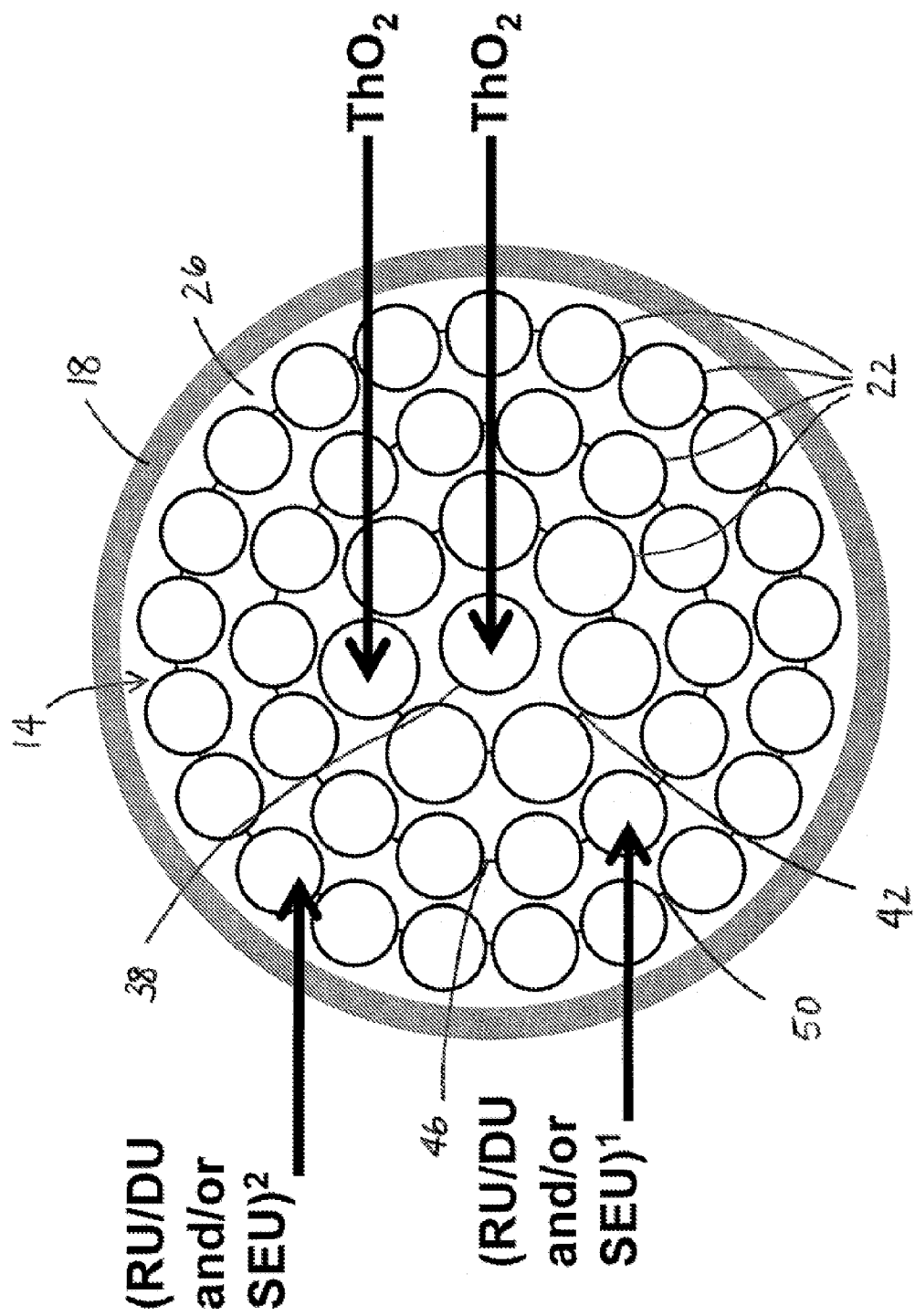
FIG. 4 is a cross-sectional view of a fourth embodiment of a nuclear fuel bundle in accordance with the invention.

In the embodiment of FIG. 4, the central element 38 includes thorium dioxide and the first plurality of elements 42 includes thorium dioxide. The second plurality of elements 46 includes a blend of RU and DU and/or includes SEU, and has a first fissile content. If a blend of RU and DU is used, the materials are blended using a method known in the art, such as but not limited to using an acid solution or dry mixing. The third plurality of elements 50 includes a blend of RU and DU and/or includes SEU, and has a second fissile content (RU/DU and/or SEU)$^2$. It is to be understood that the fissile content of the second plurality of elements 46 is chosen from the range between and including approximately 0.2 wt % to approximately 3 wt % $^{235}$U. The fissile content of the third plurality of elements 50 is also chosen from the same range, but is different from the fissile content chosen for the second plurality of elements 46. In some embodiments of FIG. 4, a BP may be included in any of the fuel elements 22. In other embodiments, the second plurality of elements 46 each includes RU, DU or SEU within the corresponding fissile content range, and similarly, the third plurality of elements 50 each includes RU, DU, or SEU within the corresponding fissile content range, the first fissile content being different from the second fissile content. In some embodiments, the fissile content of nuclear fuel decreases in an outward radial direction from the center of the fuel bundle 14. In other embodiments, the fissile content increases in an outward radial direction from the center of the fuel bundle 14.

Figure 5:
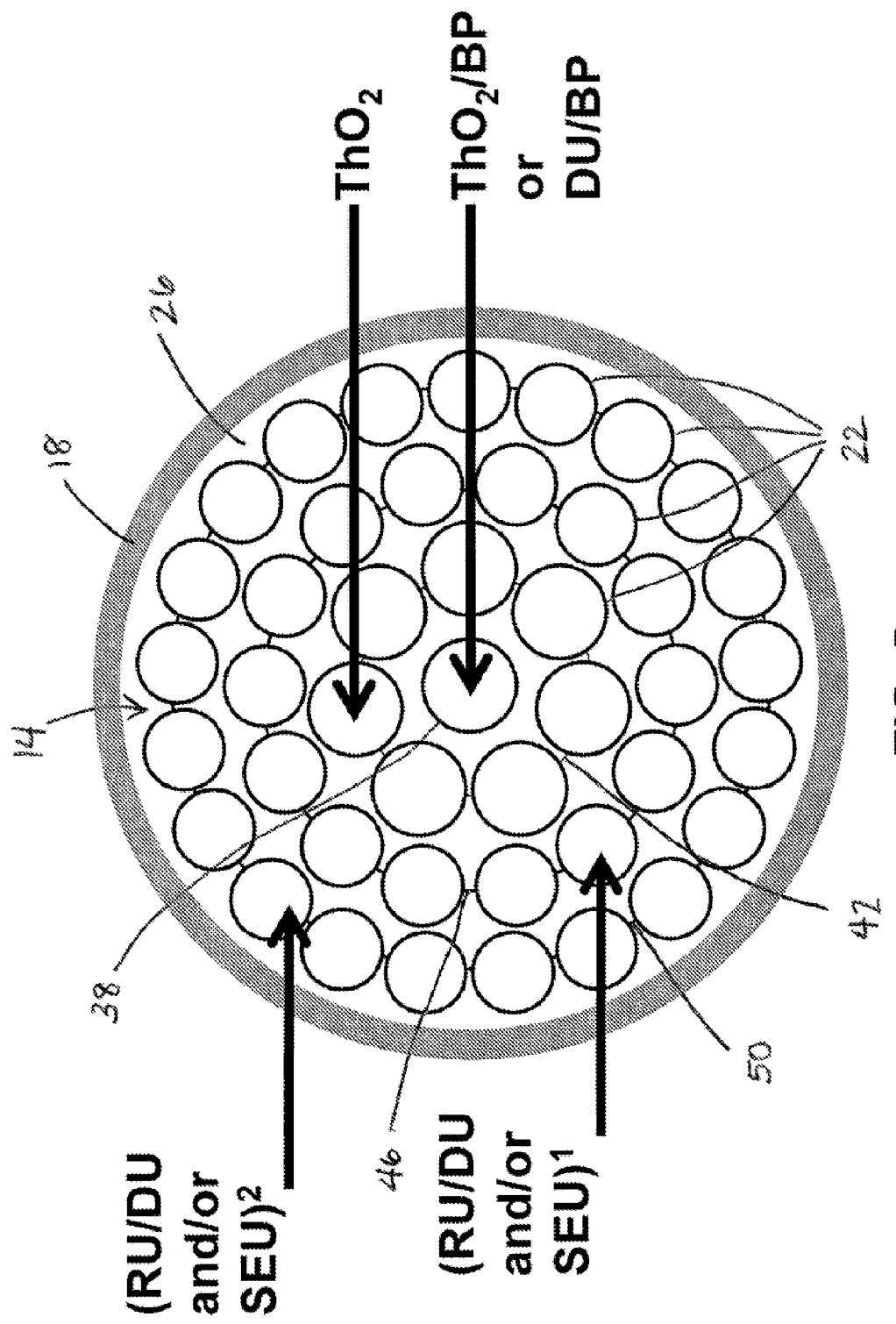
FIG. 5 is a cross-sectional view of a fifth embodiment of a nuclear fuel bundle in accordance with the invention.

In the embodiment of FIG. 5, the central element 38 includes a blend of thorium dioxide and BP (ThO$_2$/BP) or a blend of DU and BP (DU/BP). In some embodiments, 0-10 vol % BP is utilized. In other embodiments, 0-7 vol % BP is utilized. In other embodiments, 0-6 vol % BP is utilized. In still other embodiments, 0-3 vol % BP is utilized. The first plurality of elements 42 includes thorium dioxide. The second plurality of elements 46 includes a blend of RU and DU and/or includes SEU, and has a first fissile content (RU/DU and/or SEU)$^1$. If a blend of RU and DU is used, the materials are blended using a method known in the art, such as but not limited to using an acid solution or dry mixing. The third plurality of elements 50 includes a blend of RU and DU and/or includes SEU, and has a second fissile content different from the first fissile content (RU/DU and/or SEU)$^2$. It is to be understood that the fissile content of the second plurality of elements 46 (RU/DU and/or SEU)$^1$ is chosen from the range between and including approximately 0.2 wt % to approximately 3 wt % $^{235}$U. The fissile content of the third plurality of elements 50 (RU/DU and/or SEU)$^2$ is also chosen from the same range, but is different from the fissile content chosen for the second plurality of elements 46. In some embodiments of FIG. 5, a BP may be included in any of the fuel elements 22. Also, in some embodiments, the second plurality of elements 46 each includes RU, DU, or SEU within the corresponding fissile content range, and similarly, the third plurality of elements 50 each includes RU, DU or SEU within the corresponding fissile content range, the first fissile content being different from the second fissile content. In some embodiments, the fissile content of nuclear fuel decreases in an outward radial direction from the center of the fuel bundle 14. In other embodiments, the fissile content increases in an outward radial direction from the center of the fuel bundle 14.

In the embodiment of FIG. 6, the central element 38 includes either a blend of thorium dioxide and BP (ThO$_2$/BP) or thorium dioxide. In some embodiments, 0-10 vol % BP is utilized. In other embodiments, 0-7 vol % BP is utilized. In other embodiments, 0-6 vol % BP is utilized. In still other embodiments, 0-3 vol % BP is utilized. The first plurality of elements 42 includes thorium dioxide. The second plurality of elements 46 includes a blend of RU and DU and/or includes SEU, and has a first fissile content (RU/DU and/or SEU)$^1$. If a blend of RU and DU is used, the materials are blended using a method known in the art, such as but not limited to using an acid solution or dry mixing. The third plurality of elements 50 includes a blend of RU and DU and/or includes SEU, and has a second fissile content different from the first fissile content (RU/DU and/or SEU)². It is to be understood that the fissile content of the second plurality of elements 46 (RU/DU and/or SEU)¹ is chosen from the range between and including approximately 0.2 wt % to approximately 3 wt % $^{235}$U. The fissile content of the third plurality of elements 50 (RU/DU and/or SEU)² is also chosen from the same range, but is different from the fissile content chosen for the second plurality of elements 46. In some embodiments of FIG. 6, a BP may be included in any of the fuel elements 22. In other embodiments, the second plurality of elements 46 each includes RU, DU, or SEU within the corresponding fissile content range, and similarly, the third plurality of elements 50 each includes RU, DU, or SEU within the corresponding fissile content range, the first fissile content being different from the second fissile content. In some embodiments, the fissile content of nuclear fuel decreases in an outward radial direction from the center of the fuel bundle 14. In other embodiments, the fissile content increases in an outward radial direction from the center of the fuel bundle 14.

The embodiment of FIG. 7 is substantially similar to the embodiment of FIG. 6 described above, except that the fuel bundle 14 is a 37-element fuel bundle having uniformly sized fuel elements 22, as described above. The distribution of nuclear fuel in the central, first, second, and third pluralities of elements 38, 42, 46, 50, respectively, is similar to FIG. 6 and, therefore, is described above. The embodiment of FIG. 7 provides an example of how the particular number of fuel elements, the fuel element arrangement (e.g., rings of elements in the illustrated embodiments), fuel element sizes, and relative fuel element sizes can change while still embodying the present invention. In some embodiments, the fissile content of nuclear fuel decreases in an outward radial direction from the center of the fuel bundle 14. In other embodiments, the fissile content increases in an outward radial direction from the center of the fuel bundle 14.

Alternatively, any of the embodiments of FIGS. 4-7 may include a single fissile content of enriched uranium in both outer two pluralities of elements (i.e., in both the second plurality of elements 46 and the third plurality of elements 50). In some embodiments, for example, the single fissile content is chosen from a range greater than 1.8 wt %. As another example, the single fissile content is chosen from a range that is less than 1.7 wt %.

In other embodiments, any combination of RU, DU, LEU, NU and SEU (driver fuel) in two different locations in the fuel bundle 14 can be employed in combination with thorium dioxide and/or BP at other locations in the fuel bundle 14 such that the fissile content of a first element of the driver fuel is different from the fissile content of a second element of the driver fuel. The driver fuel provides the neutrons required to convert $^{232}$Thorium, which is not fissile, to $^{233}$Uranium, which is fissile, such that thorium dioxide effectively burns in a nuclear reactor. BP is used to enhance safety related parameters, most importantly coolant void reactivity (CVR) and fuel temperature coefficient (FTC). As noted above, a BP may be included in any of the elements or locations in the fuel bundle 14, or may be included in an element or location alone (i.e., without being mixed with fuel in a fuel element or otherwise being included with the fuel in a fuel element location). Also, in some embodiments, the fissile content of nuclear fuel decreases in an outward radial direction from the center of the fuel bundle 14, whereas in other embodiments, the fissile content increases in an outward radial direction from the center of the fuel bundle 14.

The embodiments and embodiments described herein may also be used with pressure tubes larger or smaller than those used in current pressure tube reactors and may also be used in future heavy water pressure tube reactors. The fuel bundles 14 of the present invention are also applicable to pressure tube reactors with different combinations of liquids/gasses in their heat transport and moderator systems. The present invention can also be employed in fuel bundles having a different number and arrangement of elements, and is not limited to 43-element and 37-element fuel bundle designs, such as those illustrated by way of example in FIGS. 1-7.

Fuel bundles utilizing thorium and uranium isotope (heterogeneous or homogeneous) compositions can allow more precise control of the power coefficient, bundle powers, channel power, flux levels, core flux shapes, critical heat flux, and core void reactivity of a nuclear reactor, such that safety requirements can be readily achieved while significantly increasing the resource utilization.

Any of the fuels described herein can be provided in inert matrix carriers, and/or can be used in such a way as to increase fuel burn-up and avoid limits of the mechanical properties of the base fuel, thus further increasing the utilization of the fuel resource. Such additions/carriers will also allow more precise control of, for example, fission gas release associated design criteria and heat transfer coefficients.

Further, in heavy water cooled reactors, the rate of neutron multiplication increases when coolant voiding occurs. Coolant voiding occurs, for example, when the coolant starts to boil. Coolant void reactivity is a measure of the ability of a reactor to multiply neutrons. This phenomenon is due to positive coolant void reactivity, and is an undesirable occurrence. The present invention can provide a significant reduction in coolant void reactivity, and can also provide a negative fuel temperature coefficient and/or a negative power coefficient.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, in various embodiments described and/or illustrated herein, LEU and SEU are blended with different types of nuclear fuel to produce nuclear fuels having desired fissile contents. It should be noted that in other embodiments, highly enriched uranium (HEU) and/or LEU can be blended with different fuel types described herein to produce nuclear fuels having the same fissile content. Such HEU and LEU nuclear fuel blends apply to all embodiments of the present invention.

What is claimed is:

1. A fuel bundle for a nuclear reactor comprising:
   a first fuel element including thorium dioxide;
   a second fuel element including uranium having a first fissile content; and
   a third fuel element including uranium having a second fissile content different from the first fissile content,
   wherein the first fuel element, the second fuel element, and the third fuel element are arranged such that a common coolant flows over each of the first fuel element, the second fuel element, and the third fuel element.

2. The fuel bundle of claim 1, wherein the uranium having the first fissile content includes recycled uranium having a fissile content of approximately 0.72 wt % of $^{235}$U to approximately 1.2 wt % of $^{235}$U.

3. The fuel bundle of claim 2, wherein the uranium having the second fissile content includes recycled uranium having a fissile content of approximately 0.72 wt % of $^{235}$U to approximately 1.2 wt % of $^{235}$U.

4. The fuel bundle of claim 2, wherein the uranium having the second fissile content includes slightly enriched uranium having a fissile content of approximately 0.9 wt % of $^{235}$U to approximately 3 wt % of $^{235}$U.

5. The fuel bundle of claim 2, wherein the uranium having the second fissile content includes natural uranium having a fissile content of approximately 0.71 wt % of $^{235}$U.

6. The fuel bundle of claim 2, wherein the uranium having the second fissile content includes low enriched uranium having a fissile content of approximately 3 wt % of $^{235}$U to approximately 20 wt % of $^{235}$U.

7. The fuel bundle of claim 1, wherein the uranium having the first fissile content includes slightly enriched uranium having a fissile content of approximately 0.9 wt % of $^{235}$U to approximately 3 wt % of $^{235}$U.

8. The fuel bundle of claim 7, wherein the uranium having the second fissile content includes slightly enriched uranium having a fissile content of approximately 0.9 wt % of $^{235}$U to approximately 3 wt % of $^{235}$U.

9. The fuel bundle of claim 7, wherein the uranium having the second fissile content includes natural uranium having a fissile content of approximately 0.71 wt % of $^{235}$U.

10. The fuel bundle of claim 7, wherein the uranium having the second fissile content includes low enriched uranium having a fissile content of approximately 3 wt % of $^{235}$U to approximately 20 wt % of $^{235}$U.

11. The fuel bundle of claim 1, wherein the uranium having the first fissile content includes natural uranium having a fissile content of approximately 0.71 wt % of $^{235}$U.

12. The fuel bundle of claim 11, wherein the uranium having the second fissile content includes low enriched uranium having a fissile content of approximately 3 wt % of $^{235}$U to approximately 20 wt % of $^{235}$U.

13. The fuel bundle of claim 1, wherein the uranium having the first fissile content includes low enriched uranium having a fissile content of approximately 3 wt % of $^{235}$U to approximately 20 wt % of $^{235}$U.

14. The fuel bundle of claim 13, wherein the uranium having the second fissile content includes low enriched uranium having a fissile content of approximately 3 wt % of $^{235}$U to approximately 20 wt % of 235U.

15. The fuel bundle of claim 2, wherein the uranium included in at least one of the second fuel element and the third fuel element is included with at least one of recycled uranium having a fissile content of approximately 0.72 wt % of $^{235}$U to approximately 1.2 wt % of $^{235}$U, depleted uranium having a fissile content of approximately 0.2 wt % of $^{235}$U to approximately 0.5 wt % of $^{235}$U, slightly enriched uranium having a fissile content of approximately 0.9 wt % of $^{235}$U to approximately 3 wt % of $^{235}$U, natural uranium having a fissile content of approximately 0.71 wt % of $^{235}$U, and low enriched uranium having a fissile content of approximately 3 wt % of $^{235}$U to approximately 20 wt % of $^{235}$U.

16. The fuel bundle of claim 2, wherein the uranium included in at least one of second fuel element and the third fuel element is included with a burnable poison.

17. The fuel bundle of claim 2, wherein the thorium dioxide included in the first fuel element is included with a burnable poison.

18. The fuel bundle of claim 1, wherein the first fuel element includes a rod of thorium dioxide.

19. The fuel bundle of claim 1, wherein the second fuel element includes a rod of the uranium having the first fissile content.

20. The fuel bundle of claim 1, wherein the third fuel element includes a rod of the uranium having the second fissile content.

21. The fuel bundle of claim 1, wherein the first fuel element includes a tube containing the thorium dioxide.

22. The fuel bundle of claim 1, wherein the second fuel element includes a tube containing the uranium having the first fissile content.

23. The fuel bundle of claim 1, wherein the third fuel element includes a tube containing the uranium having the second fissile content.

24. The fuel bundle of claim 1, wherein the second fissile content is higher than the first fissile content.

25. A nuclear reactor comprising: a tube of pressurized fluid; and the fuel bundle of claim 1.

* * * * *